(12) United States Patent
Vom Stein

(10) Patent No.: US 8,770,675 B2
(45) Date of Patent: Jul. 8, 2014

(54) SEALING ASSEMBLY AND TRACK HINGE INCLUDING THE SAME

(75) Inventor: Hans-Joachim Vom Stein, Odenthal (DE)

(73) Assignee: Aktiebolaget SKF, Gothenburg (SE)

( * ) Notice: Subject to any disclaimer, the term of this patent is extended or adjusted under 35 U.S.C. 154(b) by 802 days.

(21) Appl. No.: 12/962,025

(22) Filed: Dec. 7, 2010

(65) Prior Publication Data

US 2011/0140509 A1   Jun. 16, 2011

(30) Foreign Application Priority Data

Dec. 15, 2009   (DE) .................. 10 2009 058 216

(51) Int. Cl.
*B62D 55/15* (2006.01)
(52) U.S. Cl.
USPC ............................ 305/105; 305/103; 305/106
(58) Field of Classification Search
USPC .......... 305/100, 102–106, 202, 203; 277/399, 277/549, 381, 402
See application file for complete search history.

(56) References Cited

U.S. PATENT DOCUMENTS

| | | | | |
|---|---|---|---|---|
| 4,089,531 A * | 5/1978 | Roley et al. | ............ | 305/103 |
| 4,094,516 A | 6/1978 | Morley et al. | | |
| 4,132,418 A * | 1/1979 | Roli | ............ | 277/382 |
| 4,185,838 A * | 1/1980 | Danner | ............ | 277/562 |
| 4,195,852 A * | 4/1980 | Roley et al. | ............ | 277/380 |
| 4,256,316 A | 3/1981 | Reinsma | | |
| 4,311,346 A * | 1/1982 | Danner | ............ | 305/103 |
| 4,457,521 A * | 7/1984 | Morley | ............ | 305/103 |
| 4,469,336 A * | 9/1984 | Linne | ............ | 277/402 |
| 4,560,174 A * | 12/1985 | Bisi | ............ | 277/382 |
| 4,607,854 A | 8/1986 | Bissi et al. | | |
| 4,688,805 A * | 8/1987 | Crotti et al. | ............ | 277/381 |
| 4,819,999 A * | 4/1989 | Livesay et al. | ............ | 305/103 |
| 5,390,997 A * | 2/1995 | Nakaishi et al. | ............ | 305/103 |
| 5,763,956 A * | 6/1998 | Metz et al. | ............ | 305/102 |
| 6,139,020 A * | 10/2000 | Friend et al. | ............ | 277/399 |
| 6,739,680 B2 * | 5/2004 | Hasselbusch et al. | ............ | 305/202 |
| 7,845,740 B2 * | 12/2010 | Dahlheimer | ............ | 305/102 |
| 8,113,597 B2 * | 2/2012 | Grenzi | ............ | 305/104 |
| 2007/0267821 A1 * | 11/2007 | Vom Stein et al. | ............ | 277/500 |
| 2009/0108541 A1 * | 4/2009 | Beardsley et al. | ............ | 277/579 |
| 2010/0090523 A1 * | 4/2010 | Grenzi | ............ | 305/104 |
| 2010/0148572 A1 * | 6/2010 | Vom Stein | ............ | 305/103 |
| 2011/0140509 A1 * | 6/2011 | vom Stein | ............ | 305/105 |
| 2011/0248561 A1 * | 10/2011 | Dolata | ............ | 305/104 |
| 2011/0254364 A1 * | 10/2011 | Johannsen et al. | ............ | 305/100 |
| 2013/0200688 A1 * | 8/2013 | Vom Stein | ............ | 305/103 |

FOREIGN PATENT DOCUMENTS

| | | |
|---|---|---|
| DE | 2726033 A1 | 12/1977 |
| DE | 3111397 A1 | 10/1982 |
| DE | 102006050439 A1 | 5/2008 |

* cited by examiner

*Primary Examiner* — Glenn Dayoan
*Assistant Examiner* — Gregory Blankenship
(74) *Attorney, Agent, or Firm* — Bryan Peckjian; SKF USA Inc. Patent Department

(57) ABSTRACT

A sealing assembly provides a seal between first and second parts that are movable relative to each other. The sealing assembly comprises an elastic ring having an annular sealing lip configured to fixedly and sealingly abut on the first part. A sealing ring includes a sealing edge configured to sealingly abut on a sliding surface of the second part. A supporting ring is fixedly connected with the elastic ring and is inserted between the elastic ring and the sealing ring.

20 Claims, 3 Drawing Sheets

SEALING ASSEMBLY AND TRACK HINGE INCLUDING THE SAME

CROSS-REFERENCE

This application claims priority to German patent application no. 10 2009 058 216.9 filed on Dec. 15, 2009, the contents of which are incorporated fully herein by reference.

TECHNICAL HELD

The present invention generally relates to a sealing assembly for sealing a space between two parts that are moveable relative to each other and, e.g., to a hinge of a track having such a sealing assembly.

BACKGROUND ART

In tracks, in particular of tracked vehicles, the links of the track are typically connected with each other via pivot pin hinges. For this purpose, such a pivot pin hinge comprises a pin and a sleeve that is rotatably suspended around the pin. Links of the track are press-fit on the respective ends of the pin and the sleeve. The pivot bearing surfaces between the pin and the sleeve are lubricated by an oil reservoir in the pin. The oil chamber between the pin and the sleeve is sealed by two sealing elements that comprise sealing lips pressing against the end faces of the sleeve.

A track pin assembly having such a seal is known, for example, from DE 27 26 033 A1 and its English-counterpart U.S. Pat. No. 4,094,516 and comprises a track pin attached to a portion of a first track link and a bushing attached to a portion of a second track link. The bushing surrounds a portion of the track pin and is reciprocally movable relative to the track pin. A cavity is defined in the first track link for receiving the seal having a sealing lip for abutment on an end face of the bushing. A spacer ring surrounds the track pin and extends in the axial direction between an end face of the cavity and the end face of the bushing. The seal is inserted in the hollow space defined in the cavity and comprises a primary seal ring made of a relatively stiff, but elastic, first elastomeric material and a secondary sealing element made of a second resilient elastomeric material that is substantially less stiff than the first material.

A sealing assembly for a track pivot pin hinge is also known from U.S. Pat. No. 4,607,854, which comprises a first ring made of a flexible elastomeric material having a sleeve-like portion, a flange-like portion having a sealing lip, and a second ring made of elastic material contacting the first ring for sealing a space between a pin and a sleeve surrounding the pin. The first ring comprises a cylindrical, metallic reinforcing ring that is completely embedded in the sleeve-like portion of the first ring.

A sealing assembly and a track link are also known from DE 10 2006 050 439 A1 and its English-counterpart US 2010/0148572. This sealing assembly comprises a sealing ring having a sealing edge that sealingly abuts on an element of the track. A metallic support ring is embedded in the sealing ring for reinforcing the sealing assembly. An elastic ring is pushed onto the support ring and has a sealing lip that abuts on a further element of the track.

U.S. Pat. No. 4,256,316 discloses a joint sealing structure for sealing two joint parts that are axially movable relative to each other and includes a seal ring having a sealing lip for maintaining a dynamic seal with a sealing surface of one of the joint parts. A stiffener is provided for transferring a biasing force from a spring means to the sealing lip. The stiffener includes a flexible connecting portion permitting free movement of the sealing lip under the biasing action of the spring means over the range of movement between the joint parts.

SUMMARY

It is an object of the present teachings to disclose improved seals and sealing assemblies, as well as methods of manufacturing and using the same.

In a preferred embodiment, a sealing assembly disclosed herein may be used to seal a space between a first part of a track and a second part of the track that is at least pivotable relative to the first part. Such a sealing assembly preferably exhibits a relatively long service life.

In another preferred embodiment, a hinge of a track includes such a sealing assembly.

In a first aspect of the present teachings, a sealing assembly preferably includes an elastic ring having a radially-encircling or annular sealing lip configured to fixedly (statically) and sealingly abut on the first part of the track. A sealing ring has a sealing edge configured to sealingly abut on a sliding or sealing surface of the second part of the track. A support ring is inserted between the elastic ring and the sealing ring and the support ring is fixedly connected with the elastic ring.

In known embodiments of sealing assemblies for track hinges, among other things, movements of the track result in undefined relative movements between the elastic ring and the support ring. The wear of the elastic ring resulting therefrom negatively affects the service life of the sealing assembly and excessive wear can result in premature seal failures.

According to the first aspect of the present teachings, such a relative movement can be effectively prevented by fixedly connecting the elastic ring with the support ring, thereby reducing the wear on the elastic ring. Consequently, the service life of such a sealing assembly can be lengthened as compared to known solutions.

In another aspect of the present teachings, the support ring is preferably at least partially embedded in the elastic ring. In known solutions, the support ring was partially embedded in the sealing ring, so that a surface area would be created that was continuous with the sealing ring. This had the objective of covering the edges of the support ring and thus minimizing the wear of the elastic ring. The elastic ring had an opening, in which the support ring lay. However, the stability of the support ring was negatively affected by such a design, which can lead to the premature failure or fatigue of the seal under a load. By embedding the support ring in the elastic ring according to this aspect of the present teachings, wherein the support ring is preferably surrounded in part, the seal can be designed without an opening and in a more stable way as compared to known solutions, without foregoing the supporting effect of the support ring.

In another aspect of the present teachings, the sealing ring and the support ring are preferably pivotable relative to each other. During pivoting of the respective track parts, a major portion of the movement may absorbed by the sealing edge, which is moved along the sliding or sealing surface of the one part of the track. However, due to the pivotable arrangement of parts of the seal according to this aspect of the present teachings, a portion of the pivoting movement is transferred to these relatively pivotable parts (e.g., the sealing ring and the support ring of the sealing assembly).

In known embodiments, either the elastic ring was pivotable relative to the support ring and the sealing ring connected therewith, which leads to increased wear of the elastic ring, or the elastic ring, support ring and sealing ring were pivotable relative to one another, which leads to undefined movements and increased wear. On the other hand, in a pivotable arrangement of the sealing ring and the support ring according to this aspect of the present teachings, in which the support ring is fixedly connected with the elastic ring and thus is not pivotable relative to the elastic ring, it is possible to transfer a portion of the pivoting movement between the first and second track parts from the sealing edge of the sealing ring to the pivoting of the sealing ring relative to the support ring (i.e. a portion of the pivoting movement occurs between axially-extending contact surfaces of the sealing ring and the support ring). The wear on the sealing edge is therefore decreased so that the service life of the sealing assembly as a whole is increased.

In particular, the service life of the sealing assembly as a whole can be increased, because there is less wear on the elastic ring due to the fact that it is substantially only statically loaded during operation. That is, the elastic ring experiences substantially no or limited relative pivoting movement that would abrade and degrade it during operation, thereby preserving the useable life of the elastic ring for a longer time.

In another aspect of the present teachings, the elastic ring, the support ring and the sealing ring are designed in such a manner that a pivoting movement of the two parts of the track effects a first pivoting movement of the sealing edge relative to the sliding surface as well as causes a second pivoting movement of the sealing ring relative to the support ring. For this purpose, the sealing assembly should be adapted to the particular design of the track hinge. The wear, which occurs on the dynamically-loaded sealing edge in known embodiments, is thus reduced by intentionally reducing the proportion of movement experienced the sealing edge. This is achieved by appropriately designing the components of the sealing assembly such that a portion of the total pivoting movement is absorbed by components other than the sealing edge as a second pivoting movement. Overall, the service life of the sealing assembly can be increased by such a design according to this aspect of the present teachings.

In another aspect of the present teachings, the sealing ring has a contact surface, on which the support ring abuts. The sealing ring preferably has a sealing surface, on which an intermediate sealing lip abuts. The intermediate sealing lip is formed on the elastic ring. The sealing surface on the sealing ring is formed such that the contact surface between the support ring and the sealing ring is sealed to the outside. Thus, the contact surface between the support ring and the sealing ring is protected against the ingress of moisture and dirt so that the service life of the sealing assembly as a whole can be increased according to this aspect of the present teachings as well.

In another aspect of the present teachings, means for limiting the second pivoting movement as compared to the first pivoting movement (or as compared to the total pivotable movement of the two pivotable parts sealed by the sealing assembly) are provided such that the wear of the intermediate sealing lip and/or the contact surface due to the second pivoting movement is substantially balanced or equal in comparison with the wear of the sealing edge caused by the first pivoting movement. By appropriately selecting and designing the limiting means, the total wear caused by the respective movements of the parts is intentionally apportioned and equalized among the sealing components, so that the service life is maximized. The maximum pivot angle for the respective first and second pivoting movements should ideally be set in accordance with the materials chosen for the elastic ring and of the sealing ring so that the sealing edges of the sealing ring and the intermediate sealing lip preferably have an identically long (or substantially identically long) service life.

In another aspect of the present teachings, the elastic ring and the sealing ring are preferably made of different elastomers, e.g., the elastic ring is made from rubber and the sealing ring is made from polyurethane. In this case, the elastic ring is less stiff than the sealing ring and would be subject to more wear under the same load condition. However, in this aspect of the present teachings, the proportion of pivoting movement of the intermediate sealing lip may be selected or suitably designed so as to be relatively low in comparison with the proportion of pivoting movement of the sealing edge, so that the sealing ring and the elastic ring have the same or substantially the same service life.

In another aspect of the present teachings, the limiting means are preferably formed such that the sealing ring has at least one axial projection and the support ring has at least one radial cantilever projection disposed adjacent to the at least one axial projection in the circumferential direction. The axial projection(s) and the cantilever projection(s) are each formed in a segmented annular manner such the cantilever projection(s) form(s) at least one stop for the axial projection(s) and/or vice versa. By dimensioning the axial projection(s) and the cantilever projection(s) such that a space exists between them in the circumferential direction, the maximum pivot angle of the sealing ring relative to the support ring can be set, thereby appropriately setting the proportion of pivotable movement of the support ring relative to the sealing ring. Consequently, the amount of pivotable movement and the respective dynamic loads can thus be divided or apportioned among the sealing edge of the sealing ring and the intermediate sealing lip of the elastic ring in a simple way.

In another aspect of the present teachings, a plurality of axial projections and cantilever projections are alternately disposed in a spaced manner with reference to the circumferential direction. Each respective cantilever projection preferably lies between two axial projections and each respective axial projection lies between two cantilever projections. A particularly stable and efficiently-acting limitation of the pivot angle results thereby.

In another aspect of the present teachings, the support ring is disposed in a recess of the elastic ring. A bent segment is disposed or defined on one end of the support ring and the bent section is partially surrounded by material of the elastic ring.

In another aspect of the present teachings, an annular-extending bulge is formed or defined on the radially outer surface of the elastic ring. The bulge projects radially outwardly and obliquely relative to an opposing surface (e.g. a portion or part of a track hinge). After the elastic ring is appropriately inserted, the bulge may advantageously prevent the elastic ring from falling out during the installation.

In another aspect of the present teachings, the support ring is configured to at least substantially prevent a direct contact of the elastic ring and the sealing ring in the range of pressures normally applied in the radial direction during operation of the device (e.g., a track hinge) sealed by the sealing assembly. Direct contact of the two sealing components against each other, and thus wear, is thereby effectively prevented.

In another aspect of the present teachings, the first part of the track hinge comprises a pin and at least one outer track link press-fit on one end of the pin. The second part of the track hinge comprises a sleeve, which is pushed on the pin and is at least pivotable on or about the pin. At least one inner track link is press-fit on one end of the sleeve. The sealing assemblies according to any aspect of the present teachings can be advantageously utilized in such a track link embodiment.

In another aspect of the present teachings, sealing edges of the sealing ring and/or the sealing lip of the elastic ring are configured to abut on an end face of the sleeve.

Further objects, features and advantages of the present teachings will be understood after reading the following exemplary embodiments and claims in view of the Figures.

DETAILED DESCRIPTION OF THE INVENTION

Figure 1:
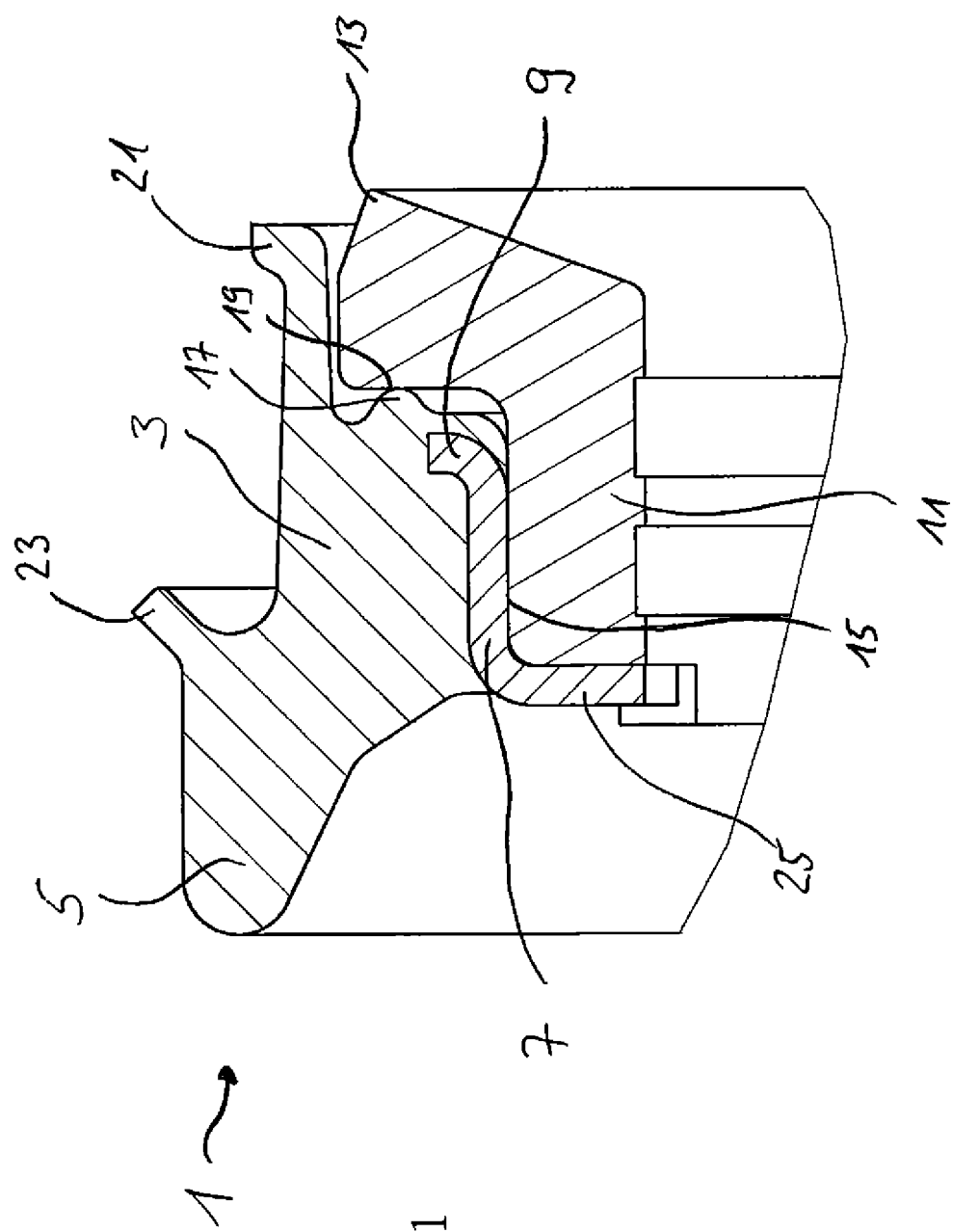
FIG. 1 shows a schematic illustration of an exemplary embodiment of the present teachings.

FIG. 1 shows a seal 1 in a schematic cross-sectional illustration. The seal 1 comprises an elastic ring 3, which is comprised of an elastomer. The elastic ring 3 includes a sealing lip 5, which is formed for abutting on a sealing surface or an opposing surface. The elastic ring 3 is designed in a radially-encircling manner (e.g., it is annular shaped) and is fixedly connected with a support ring 7 on its radially-inward oriented side.

The support ring 7 is preferably made of a rigid material, such as metal or hard plastic, and has a bent segment 9, which is oriented radially-outward. The bent section 9 is partially surrounded by the material of the elastic ring 3, whereby the connection between the support ring 7 and the elastic ring 3 is reinforced and the supporting effect of the support ring 7 is enhanced. For example, the support ring 7 and the elastic ring 3 can be connected with each other by a vulcanization process or by an adhesive agent. Radial and axial movements of the two parts relative to each other are thereby precluded.

The seal 1 further comprises a sealing ring 11 having a substantially L-shaped, annular contour and is formed so as to be substantially complementary to the elastic ring 3. The sealing ring 11 includes a sealing edge 13 that is disposed substantially opposite of the sealing lip 5 of the elastic ring 3 in the axial direction. The sealing edge 13 is configured to abut on a sliding (sealing) surface 58 (see FIG. 3).

The sealing ring 11 also has a contact surface 15 disposed radially inward of the sealing edge 13 and axially displaced therefrom. The sealing ring 11 abuts on the support ring 7 in an axially overlapping manner along the contact surface 15. However, the support ring 7 is not fixedly connected with the sealing ring 11, so that a pivoting movement of the support ring 7 relative to the sealing ring 11 is possible.

The elastic ring 3 includes an intermediate sealing lip 17 for protecting the contact surface 15 against the ingress of dirt and moisture. The intermediate sealing lip 17 abuts on a sealing surface 19 of the sealing ring 11.

The elastic ring 3 further includes an annular axial projection 21 that extends in the same direction as the sealing edge 13 and is disposed radially outwardly of the sealing edge 13. When the seal 1 is installed as intended, the annular axial projection 21 sealingly abuts on the same sealing surface (58) as the sealing edge 13. The annular axial projection 21 thus serves as an additional seal and, in particular, as protection for the sealing edge 13.

The outer surface side of the elastic ring 3 includes an annular-extending bulge 23 projecting outwardly and obliquely to the right side in FIG. 1. After the seal 1 has been appropriately inserted into the device to be sealed thereby, the bulge 23 advantageously prevents the seal 1 from falling out again during the installation process.

One axial end of the support ring 7 includes a plurality of radially-inward-extending cantilever projections 25 that serve to axially retain the sealing ring 11. The cantilever projections 25 are distributed along the circumference of the support ring 7.

Figure 2:
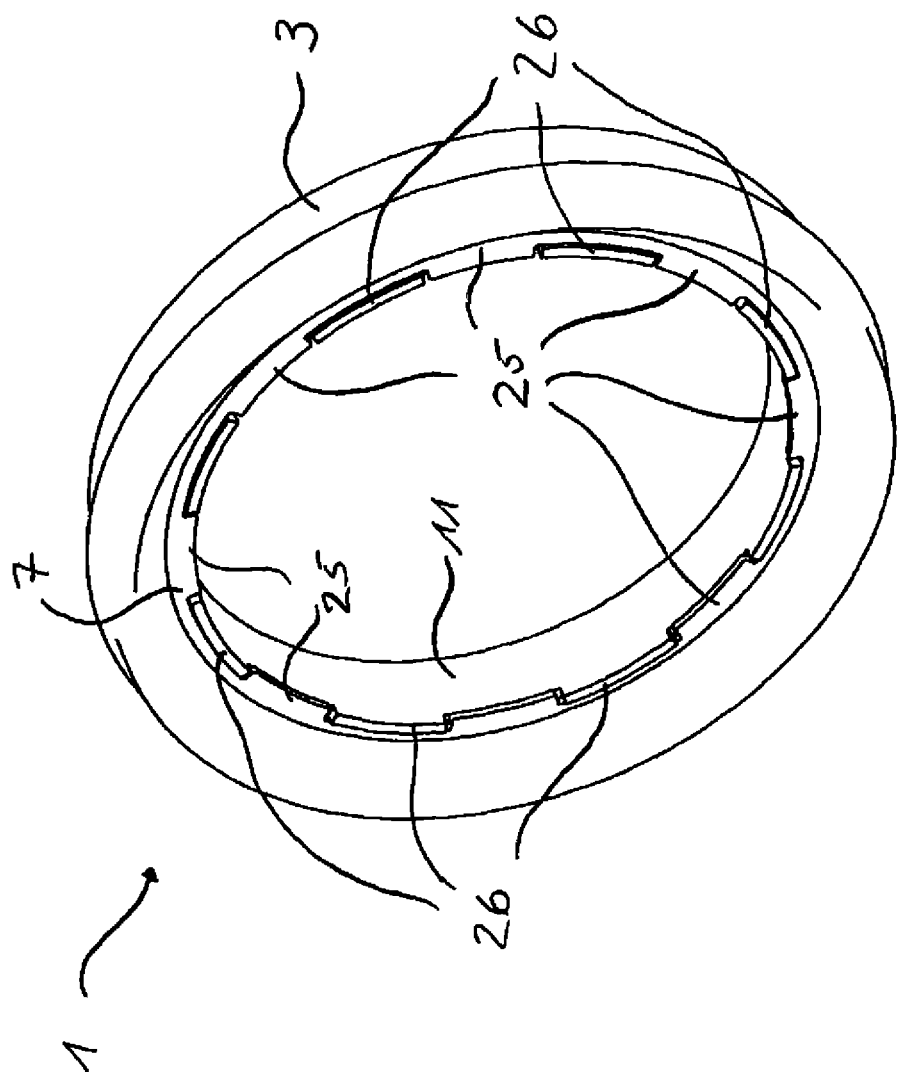
FIG. 2 shows a perspective view of the exemplary embodiment of FIG. 1.

As shown in FIG. 2, a plurality of axial projections 26 are defined on one axial end of the sealing ring 11. Each axial projection 26 extends into the area or space between two adjacent cantilever projections 25 in the circumferential direction.

The radial-extending cantilever projections 25 of the support ring 7 and the axial projections 26 of the sealing ring 11 are dimensioned such that defined gaps remain between them. That is, the circumferential length (arc length) of one radially-extending cantilever projection 25 is less than the circumferential length (arc length) defined between two adjacent axial projections 26. Therefore, pivoting of the sealing ring 11 relative to the support ring 7 is possible with the projections 25, 26 providing one representative, non-limiting example of a means for limiting the pivotable movement of the sealing ring 11 relative to the support ring 7 according to the present teachings. Speaking more generally, the cantilever projections 25 form stops for the axial projections and/or vice versa during the pivoting movement, so that the pivoting movement of the sealing ring 11 relative to the support ring 7 is limited in a well-defined manner.

The interaction of the cantilever projections 25 with the axial projections of the sealing ring 11 will now be further explained with the assistance of FIG. 2, which shows a perspective view of the seal 1.

The elastic ring 3 surrounds the support ring 7 and the sealing ring 11 in the radial direction. The cantilever projections 25 of the support ring 7 are disposed in a segmented and spaced manner along the circumference of the support ring 7. One axial projection 26 of the sealing ring 11 respectively lies between each two cantilever projections 25. The axial projections 26, however, do not completely fill the space between the cantilever projections 25, so that a limited pivoting movement of the sealing ring 11 is possible relative to the support ring 7 and thus to the elastic ring 3 connected therewith. The cantilever projections 25, however, each form a stop for the projections 26 so that the pivoting angle of the two components is limited. The advantage of the limited pivoting movement will be explained further below with the assistance of FIG. 3.

The limitation of the pivoting movement can be alternatively achieved with one cantilever projection 25 between two projections 26 or with one projection 26 between two cantilever projections 25. In principle, any number of the different elements can be provided in an interacting manner to perform the pivot limiting function and any type of design that provides abutment stops on the relatively-moving parts may be utilized in accordance with the present teachings. It is important simply that the possible range of pivoting movement between the sealing ring 11 and the support ring 7 is limited with reference to the total range of pivoting movement of the device that will be sealed by the seal 1. That is, the range or amount of pivoting movement between the sealing ring 11 and the support ring 7 should be less than the total range or amount of pivoting movement between two relatively-pivotable parts of the device (e.g., a track hinge) to be sealed.

Figure 3:
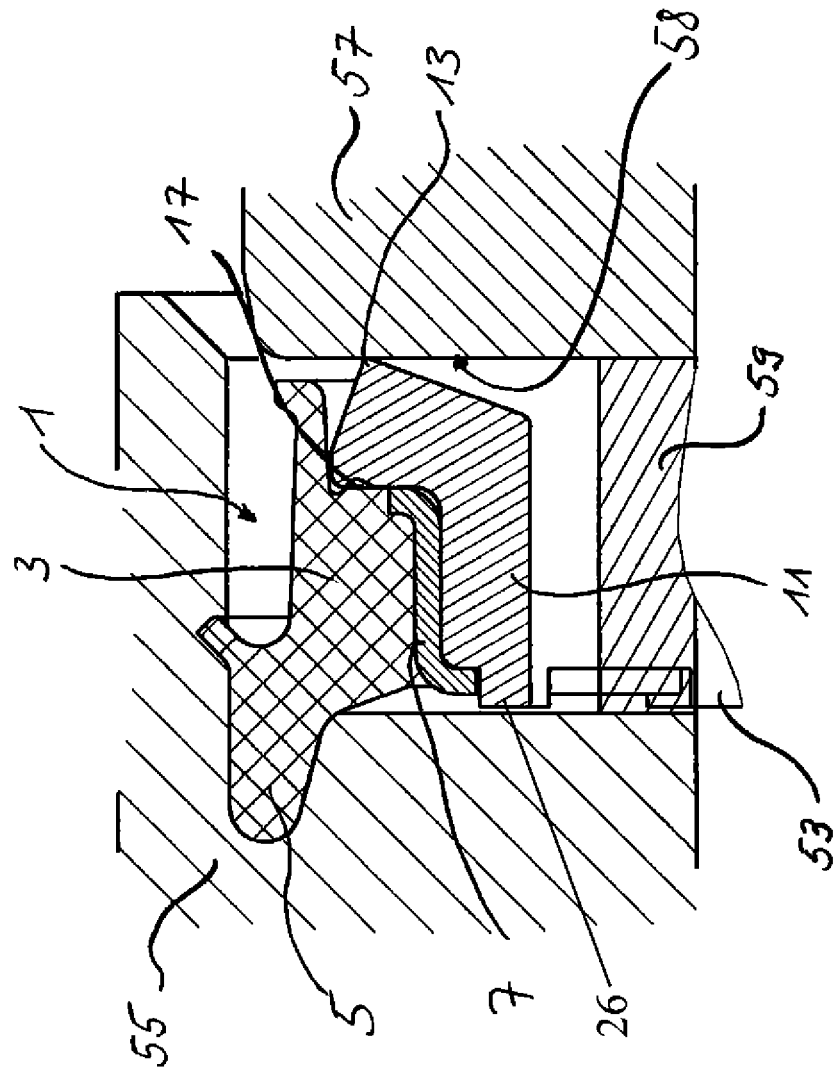
FIG. 3 shows the exemplary embodiment of FIG. 1 being utilized to seal a track hinge.

FIG. 3 depicts a cross-section of a representative hinge 51 of a track. A seal 1 is inserted between a first part of the track and a second part of the track, which is at least pivotable relative to the first. Although the presently preferred use of the present sealing assemblies is in a track hinge, the skilled person will understand that sealing assemblies according to the present teachings may be utilized in any application that requires a seal between two pivotable parts.

The first part of the track comprises a pin 53, only a segment of which is depicted here, and an outer chain link 55. One of the cylindrical bores of outer chain link 55 is press-fit onto the pin 53. The second part of the track comprises a sleeve 57 suspended over or around the pin 53 with a radial clearance therebetween. The sleeve 57 is at least pivotable relative to the pin 53. A not-illustrated inner track link is press-fit on the sleeve 57. A spacer ring 59 is disposed between the outer track link 55 and the sleeve 57 with an axial clearance therebetween and is suspended over or around the pin 53 with a radial clearance.

The seal 1 according to the FIGS. 1 and 2 is pushed over the spacer ring 59. As a result, the sealing edge 13 of the seal 1 will serve to seal the space that extends substantially between the outer surface of the pin 53 and the inner surface of the sleeve 57 and is normally filled with oil or lubricant during operation. The sealing edge 13 sealingly abuts on the end face of the sleeve 57 when the seal 1 is installed as intended. A sliding (sealing) surface 58 is defined on the sleeve 57. Further, the radially-inner surface of the sealing ring 11 of the seal 1 abuts extensively on the radially-outer surface of the spacer ring 59.

The sealing lip 5 of the elastic ring 3 statically abuts on a corresponding sealing surface of the track link 55 in the direction towards the outer track link 55.

In FIG. 3, the first and second parts 55, 57 of the track and the spacer ring 59 are illustrated in a final assembled state. On the other hand, the elastic ring 3 and the sealing ring 11 are illustrated in a still-undeformed state that exists before the two parts 55, 57 of the track are pushed together. When the two parts 55, 57 of the track are assembled as intended as illustrated in FIG. 3, the elastic ring 3 will be highly deformed, whereby the sealing lip 5 will sealingly abut on the outer track link 55. In addition, the inner surface of the elastic ring 3 will press the sealing ring 11 via the support ring 7 onto the outer surface of the spacer ring 59 and the sealing edge 13 will be pressed against the sliding surface 58 of the sleeve 57. Further, the annular axial projection 21 of the elastic ring 3 will be pressed against the end face (e.g., the sliding surface 58) of the sleeve 57 and the intermediate sealing lip 17 of the elastic ring 3 will be pressed against the sealing surface 19 of the sealing ring 11.

During operation, the two parts 55, 57 of the track pivot relative to each other over a defined pivot angle, e.g., typically up to 30°. Thus, the pin 53 having the outer track link 55 pressed thereon pivots relative to the sleeve 57 having the inner track link attached thereto. Due to the relative pivoting movement of these components, certain portions of the sealing elements of the seal 1 are dynamically loaded as will be discussed below. On the other hand, the sealing lip 5 of the elastic ring 3 statically abuts on the track link 55 so that the elastic ring 3 and the support ring 7 fixedly connected therewith do not move relative to the track link 55.

The sealing edge 13 of the sealing ring 11 is dynamically loaded and thus moves (e.g., slides) relative to the sleeve 57 during operation. That is, the sealing edge 13 slides along the sliding surface 58 of the sleeve 57 while maintaining a seal during the pivoting movement of the track parts. Consequently, the wear on the dynamic sealing lip 13 is higher than the wear on the static sealing lip 5 of the elastic ring 3.

In order to minimize the wear on the sealing edge 13 and thus increase the overall service life of the seal 1, the support ring 7 and the sealing ring 11 are formed such that they can carry out a limited pivoting movement relative to each other. Consequently, the total pivoting movement of the two track parts is not absorbed solely by the sealing edge 13, but rather is absorbed, in part, between the support ring 7 and the sealing ring 11. The wear of the sealing edge 13 is therefore less than in previously-known embodiments, in which the support ring 7 is rigidly or fixedly connected with the sealing ring 11.

The intermediate sealing lip 17 is dynamically loaded due the pivoting movement of the support ring 7 having the elastic ring 3 connected therewith relative to the sealing ring 11, which in turn increases its wear. The same is true for the contact surface 15 between the support ring 7 and the sealing ring 11. However, the total wear of the seal 1 caused by the pivoting movement of the track links is apportioned or divided among the sealing edge 13 and the intermediate sealing lip 17, whereby the service life of the seal 1 is increased as a whole as compared to embodiments, in which only one of the sealing elements is dynamically loaded during operation.

The permitted range of the pivoting angle of the support ring 7 relative to the sealing ring 11 is preferably set in accordance with the design and the choice of material of the seal 1. In the construction of each seal 1, the pivot angle can be set such that the spaces between the cantilever projections 25 and the axial projections of the sealing ring 11 are suitably dimensioned. Ideally, by appropriately setting the maximum pivot angle, the wear is apportioned between the sealing edge 13 and the intermediate sealing lip 17 so that the two parts have the same or substantially the same service live. In this case, the service life of the seal 1 as a whole is maximal.

When the two track links pivot relative to each other, the support ring 7 initially pivots relative to the sealing ring 11, because the elastic ring 3 with the connected support ring 7 frictionally abuts the track link 55 and the sealing ring 11 frictionally abuts the sleeve 57. However, as soon as the maximum pivoting angle of the support ring 7 and the sealing ring 11 is reached and the cantilever projections 25 block (contact) the axial projections 26 of the sealing ring 11, the remaining pivoting movement of the track links causes a sliding (pivoting) movement of the sealing edge 13 on the sleeve 57. This two-part pivoting process takes place in an analogous manner during the return pivoting of the two track links.

The sealing ring 11 is preferably made of elastomeric material, e.g., polyurethane, which optionally may be reinforced with fibers. The elastic ring 3 likewise preferably comprises elastomeric material, e.g., rubber, and is preferably less stiff than the sealing ring 11. The support ring 7 is made of a relatively rigid material, such as metal or hard plastic, and is preferably considerably stiffer than the sealing ring 11 and the elastic ring 3.

The limited range of pivotable movement between the sealing ring 11 and the supporting ring 7 is preferably selected in view of the wear properties of the elastic ring 3, in particular the intermediate sealing ring 19, as compared to the wear properties of the sealing ring 11. In case the material of the elastic ring 3 wears or degrades more quickly than the material of the sealing ring 11 under identical loading conditions, then the pivoting range of movement for the sealing ring 11 relative to the supporting ring 7 is preferably less than 50% of the total pivotal range of movement of the two track hinge parts, more preferably less than 40% thereof, even more preferably less than 30% thereof, still more preferably less than 20% thereof, still more preferably less than 10% thereof, but at least 2% thereof, more preferably at least 5% thereof.

Naturally, if the material of the sealing lip 11 (and in particular the sealing edge 13) wears more quickly than the material of the elastic ring 3 (and in particular the intermediate sealing lip 19), then the pivoting range of movement for the for the sealing ring 11 relative to the supporting ring 7 is preferably more than 50% of the total pivotal range of movement of the two track hinge parts, more preferably more than 60% thereof, even more preferably more than 70% thereof, still more preferably more than 80% thereof, still more preferably more than 90% thereof, but less than 98% thereof, more preferably less than 95% thereof.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sealing assemblies, sealed track hinges and methods for manufacturing the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A sealing assembly configured to seal a space between first and second parts that are pivotable relative to each other, comprising:
   an elastic ring having a sealing lip configured to statically and sealingly abut on a portion of the first part,
   a sealing ring having a sealing edge configured to sealingly abut on a sliding surface of the second part, and
   a supporting ring interleaved between the elastic ring and the sealing ring, the supporting ring being fixedly connected with the elastic ring, and
   wherein at least one of:
   (a) the sealing ring is pivotable relative to the supporting ring,
   (b) the elastic ring, the supporting ring and the sealing ring are configured such that a pivoting movement of the first part relative to the second part results in a first pivoting movement of the sealing edge relative to the sliding surface and a second pivoting movement of the sealing ring relative to the supporting ring, and
   (c) the sealing ring slidably abuts on a contact surface of the supporting ring.

2. A sealing assembly according to claim 1, wherein the sealing ring is pivotable relative to the supporting ring.

3. A sealing assembly according to claim 2, wherein the elastic ring, the supporting ring and the sealing ring are configured such that a pivoting movement of the first part relative to the second part results in a first pivoting movement of the sealing edge relative to the sliding surface and a second pivoting movement of the sealing ring relative to the supporting ring.

4. A sealing assembly according to claim 3, wherein the sealing ring slidably abuts on a contact surface of the supporting ring.

5. A sealing assembly according to claim 4, wherein the elastic ring includes an intermediate sealing lip that slidably abuts on a sealing surface of the sealing ring and the sealing surface of the sealing ring is disposed such that the contact surface between the supporting ring and the sealing ring is sealed to the outside.

6. A sealing assembly according to claim 5, further comprising means for limiting the second pivoting movement relative to the first pivoting movement, such that wear of at least one of the intermediate lip and the contact surface due to the second pivoting movement is substantially equal to wear of the sealing edge due to the first pivoting movement during operation.

7. A sealing assembly according to claim 6, wherein the limiting means comprises:
   at least one axial projection extending from the sealing ring and
   at least one cantilever projection radially inwardly extending from the supporting ring,
   wherein the cantilever projection and the axial projection are each formed in a segmented manner in a circumferential direction of the sealing assembly and
   at least one of: (i) the cantilever projection forms a pivot stop for the axial projection in the circumferential direction and (ii) the axial projection forms a pivot stop for the cantilever projection in the circumferential direction.

8. A sealing assembly according to claim 7, wherein a plurality of axial projections and cantilever projections are disposed spaced from each other in an alternating and opposing manner with reference to the circumferential direction, the respective axial projections being interleaved between respective cantilever projections in the circumferential direction.

9. A sealing assembly according to claim 8, wherein an arc length between two adjacent cantilever projections in the circumferential direction is less than an arc length of the axial projection disposed therebetween.

10. A sealing assembly according to claim 9, wherein the supporting ring is disposed in a recess of the elastic ring and wherein one axial end of the supporting ring includes a radially-outwardly bent segment that is surrounded, at least in parts, by the material of the elastic ring.

11. A sealing assembly according to claim 1, wherein the elastic ring, the supporting ring and the sealing ring are configured such that a pivoting movement of the first part relative to the second part results in a first pivoting movement of the sealing edge relative to the sliding surface and a second pivoting movement of the sealing ring relative to the supporting ring.

12. A sealing assembly according to claim 11, further comprising means for limiting the second pivoting movement relative to the first pivoting movement, such that wear of at least one of an intermediate sealing lip of the elastic ring and an axial contact surface of the sealing ring due to the second pivoting movement is substantially equal to wear of the sealing edge due to the first pivoting movement during operation.

13. A sealing assembly according to claim 1, wherein the sealing ring slidably abuts on a contact surface of the supporting ring.

14. A hinge of a track comprising:
a first track link,
a second track link configured to be at least pivotable relative to the first track link, and
the sealing assembly according to claim 10 disposed so as to seal a lubrication chamber defined, in part, by the first and second track links.

15. A hinge of a track comprising:
a first track link,
a second track link configured to be at least pivotable relative to the first track link, and
the sealing assembly according to claim 1 disposed so as to seal a lubrication chamber defined, in part, by the first and second track links.

16. An apparatus configured to seal a lubrication chamber defined, at least partially, by first and second parts that are at least pivotable relative to each other, the seal comprising:
a first elastomeric ring having an sealing lip configured to statically abut in a sealing manner on a portion of the first part,
a second elastomeric ring having a sealing edge configured to dynamically abut in a sealing manner on a sliding surface of the second part, and
a support ring interleaved between the first elastomeric ring and the second elastomeric ring, the support ring being rigidly connected with the first elastomeric ring, such that the support ring does not move relative to the first part when the first part pivots relative to the second pail, and wherein the support ring slidably contacts the second elastomeric part along an axially-extending surface.

17. An apparatus according to claim 16, wherein the second elastomeric ring is pivotable relative to the support ring.

18. An apparatus according to claim 17, wherein the first elastomeric ring, the support ring and the second elastomeric ring are configured such that a total range of pivoting movement of the first part relative to the second part is equal to a first range of pivoting movement of the sealing edge relative to the sliding surface plus a second range of pivoting movement of the second elastomeric ring relative to the support ring.

19. An apparatus according to claim 18, wherein at least two stops are defined on one of the support ring and the second elastomeric ring and at least one projection is defined on the other of the support ring and the second elastomeric ring, the at least one projection being disposed between the at least two stops, the at least one projection and the at least two stops being sized to permit the second range of pivoting movement of the second elastomeric ring relative to the support ring.

20. An apparatus according to claim 16, wherein at least two stops are defined on one of the support ring and the second elastomeric ring and at least one projection is defined on the other of the support ring and the second elastomeric ring, the at least one projection being disposed between the at least two stops, the at least one projection and the at least two stops being sized to permit a limited range of pivoting movement of the second elastomeric ring relative to the support ring, the limited range between about 5-30% of a total range of pivotable movement between the first and second parts.

* * * * *